United States Patent
Filatov

(10) Patent No.: US 8,183,854 B2
(45) Date of Patent: May 22, 2012

(54) MEASURING LINEAR VELOCITY

(75) Inventor: Alexei V. Filatov, Fullerton, CA (US)

(73) Assignee: Calnetix Technologies, L.L.C., Yorba Linda, CA (US)

( * ) Notice: Subject to any disclaimer, the term of this patent is extended or adjusted under 35 U.S.C. 154(b) by 550 days.

(21) Appl. No.: 12/267,517

(22) Filed: Nov. 7, 2008

(65) Prior Publication Data

US 2010/0117627 A1  May 13, 2010

(51) Int. Cl.
*G01P 3/46* (2006.01)

(52) U.S. Cl. .................. 324/163; 324/179; 324/529

(58) Field of Classification Search .................. None
See application file for complete search history.

(56) References Cited

U.S. PATENT DOCUMENTS

| | | | |
|---|---|---|---|
| 1,916,256 A | 7/1933 | Chandeysson |
| 2,276,695 A | 3/1942 | Lavarello |
| 2,345,835 A | 4/1944 | Serduke |
| 2,409,857 A | 10/1946 | Hines et al. |
| 2,917,636 A | 12/1959 | Akeley |
| 3,060,335 A | 10/1962 | Greenwald |
| 3,064,942 A | 11/1962 | Martin |
| 3,439,201 A | 4/1969 | Levy et al. |
| 3,943,443 A | 3/1976 | Kimura et al. |
| 4,127,786 A | 11/1978 | Volkrodt |
| 4,170,435 A | 10/1979 | Swearingen |
| 4,260,914 A | 4/1981 | Hertrich |
| 4,358,697 A | 11/1982 | Liu et al. |
| 4,362,020 A | 12/1982 | Meacher et al. |
| 4,415,024 A | 11/1983 | Baker |
| 4,635,712 A | 1/1987 | Baker et al. |
| 4,659,969 A | 4/1987 | Stupak |
| 4,740,711 A | 4/1988 | Sato et al. |
| 5,003,211 A | 3/1991 | Groom |
| 5,083,040 A | 1/1992 | Whitford et al. |
| 5,241,425 A | 8/1993 | Sakamoto et al. |

(Continued)

FOREIGN PATENT DOCUMENTS

DE  102006004836 A1  5/2007

(Continued)

OTHER PUBLICATIONS

U.S. Appl. No. 12/358,172, filed Jan. 22, 2009; 26 pages specification, claims, and abstract; 13 pages of drawings.

(Continued)

*Primary Examiner* — Jermele M Hollington
*Assistant Examiner* — Trung Q Nguyen
(74) *Attorney, Agent, or Firm* — Fish & Richardson P.C.

(57) ABSTRACT

An apparatus for measuring linear velocity of a movable element relative to a stationary element includes a magnetic element fixed in relation to the stationary element. A soft-magnetic yoke is fixed in relation to the movable element to move with the movable element and is in non-contact relation with the magnetic element. A yoke pole is positioned proximate to the magnetic element and spaced therefrom by an air gap. The pole is magnetically coupled to the magnetic element so that a magnetic flux is generated in the air gap substantially orthogonal to the axis of motion. A conductive coil is coiled around a coil axis and is fixed in relation to the stationary element with the coil axis substantially parallel to the axis of movement. The coil is in non-contact relation with the yoke and resides between the magnetic element and the pole of the yoke in the magnetic flux.

20 Claims, 7 Drawing Sheets

U.S. PATENT DOCUMENTS

| | | | |
|---|---|---|---|
| 5,315,197 A | 5/1994 | Meeks et al. | |
| 5,481,145 A | 1/1996 | Canders et al. | |
| 5,514,924 A | 5/1996 | McMullen et al. | |
| 5,559,379 A | 9/1996 | Voss | |
| 5,589,262 A * | 12/1996 | Kiuchi et al. | 428/336 |
| 5,627,420 A | 5/1997 | Rinker et al. | |
| 5,672,047 A | 9/1997 | Birkholz | |
| 5,739,606 A | 4/1998 | Takahata et al. | |
| 5,767,597 A | 6/1998 | Gondhalekar | |
| 5,942,829 A | 8/1999 | Huynh | |
| 5,994,804 A | 11/1999 | Grennan et al. | |
| 6,087,744 A | 7/2000 | Glauning | |
| 6,130,494 A | 10/2000 | Schöb | |
| 6,148,967 A | 11/2000 | Huynh | |
| 6,167,703 B1 | 1/2001 | Rumez et al. | |
| 6,191,511 B1 | 2/2001 | Zysset | |
| 6,268,673 B1 | 7/2001 | Shah et al. | |
| 6,270,309 B1 | 8/2001 | Ghetzler et al. | |
| 6,304,015 B1 | 10/2001 | Filatov et al. | |
| 6,313,555 B1 | 11/2001 | Blumenstock et al. | |
| 6,325,142 B1 | 12/2001 | Bosley et al. | |
| 6,359,357 B1 | 3/2002 | Blumenstock | |
| 6,437,468 B2 | 8/2002 | Stahl et al. | |
| 6,465,924 B1 | 10/2002 | Maejima | |
| 6,664,680 B1 | 12/2003 | Gabrys | |
| 6,700,258 B2 | 3/2004 | McMullen et al. | |
| 6,727,617 B2 | 4/2004 | McMullen et al. | |
| 6,794,780 B2 | 9/2004 | Silber et al. | |
| 6,856,062 B2 | 2/2005 | Heiberger et al. | |
| 6,876,194 B2 | 4/2005 | Lin et al. | |
| 6,885,121 B2 | 4/2005 | Okada et al. | |
| 6,897,587 B1 | 5/2005 | McMullen et al. | |
| 6,925,893 B2 * | 8/2005 | Abe et al. | 73/862.332 |
| 6,933,644 B2 | 8/2005 | Kanebako | |
| 7,042,118 B2 | 5/2006 | McMullen et al. | |
| 7,557,480 B2 | 7/2009 | Filatov | |
| 2001/0030471 A1 | 10/2001 | Kanebako | |
| 2002/0006013 A1 * | 1/2002 | Sato et al. | 360/126 |
| 2002/0175578 A1 | 11/2002 | McMullen et al. | |
| 2003/0155829 A1 | 8/2003 | McMullen et al. | |
| 2005/0093391 A1 | 5/2005 | McMullen et al. | |
| 2007/0056285 A1 | 3/2007 | Brewington | |
| 2007/0063594 A1 | 3/2007 | Huynh | |
| 2007/0164627 A1 | 7/2007 | Brunet et al. | |
| 2007/0200438 A1 | 8/2007 | Kaminski et al. | |
| 2007/0296294 A1 | 12/2007 | Nobe et al. | |
| 2008/0211355 A1 | 9/2008 | Sakamoto et al. | |
| 2008/0246373 A1 | 10/2008 | Filatov | |
| 2008/0252078 A1 | 10/2008 | Myers | |
| 2009/0004032 A1 | 1/2009 | Kaupert | |
| 2009/0201111 A1 | 8/2009 | Filatov | |
| 2010/0090556 A1 | 4/2010 | Filatov | |
| 2010/0301840 A1 | 12/2010 | Filatov | |
| 2011/0101905 A1 | 5/2011 | Filatov | |
| 2011/0163622 A1 | 7/2011 | Filatov et al. | |

FOREIGN PATENT DOCUMENTS

| | | |
|---|---|---|
| EP | 0774824 | 5/1997 |
| EP | 1905948 | 4/2008 |
| GB | 2225813 | 6/1990 |
| JP | 63277443 | 11/1988 |
| JP | 2006136062 A | 5/2006 |

OTHER PUBLICATIONS

Notice of Allowance issued in U.S. Appl. No. 12/358,172, filed Sep. 20, 2011, 10 pages.

U.S. Appl. No. 13/116,991, filed May 26, 2011, Filatov.

U.S. Appl. No. 13/045,379, filed Mar. 10, 2011, Filatov.

Hawkins, Lawrence A. et al., "Application of Permanent Magnet Bias Magnetic Bearings to an Energy Storage Flywheel," Fifth Symposium on Magnetic Suspension Technology, Santa Barbara, CA, Dec. 1-3, 1999, pp. 1-15.

Turboden—Organic Rankine Cycle, "Turboden High Efficiency Rankine for Renewable Energy and Heat Recovery," (2 pages), available at http://www.turboden.it/orc.asp, 1999-2003, printed Jul. 27, 2006.

Turboden—Applications, "Turboden High Efficiency Rankine for Renewable Energy and Heat Recovery," (1 page), available at http://www.turboden.it/applications_detail_asp?titolo=Heat+recovery, 1999-2003, printed Jul. 27, 2006.

Honeywell, "Genetron® 245fa Applications Development Guide," (15 pages), 2000.

Hawkins, Lawrence A. et al., "*Analysis and Testing of a Magnetic Bearing Energy Storage Flywheel with Gain-Scheduled, Mimo Control*," Proceedings of ASME Turboexpo 2000, Munich, Germany, May 8-11, 2000, pp. 1-8.

McMullen, Patrick T. et al., "*Combination Radial-Axial Magnetic Bearing*," Seventh International Symposium on Magnetic Bearings, ETH Zurich, Aug. 23-25, 2000, pp. 473-478.

Hawkins, Lawrence et al., "*Shock and Vibration Testing of an AMB Supported Energy Storage Flywheel*," $8^{th}$ International Symposium on Magnetic Bearings, Mito, Japan, Aug. 26-28, 2002, 6 pages.

McMullen, Patrick T. et al., "*Design and Development of a 100 KW Energy Storage Flywheel for UPS and Power Conditioning Applications*," $24^{th}$ International PCIM Conference, Nuremberg, Germany, May 20-22, 2003, 6 pages.

Hawkins, Larry et al., "*Development of an AMB Energy Storage Flywheel for Industrial Applications*," $7^{th}$ International Symposium on Magnetic Suspension Technology, Fukoka, Japan, Oct. 2003, 5 pages.

Freepower FP6,, "Freepower FP6 Specification & Dimensions for 6kWe Electricity Generating Equipment," (2 pages), 2000-2004, printed Jul. 26, 2006.

Hawkins, Larry et al., "*Development of an AMB Energy Storage Flywheel for Commercial Application*," International Symposium on Magnetic Suspension Technology, Dresden, Germany, Sep. 2005, 5 pages.

Freepower ORC Electricity Company with Industrial Processes, "Industrial Processes," (1 page), available at http://www.freepower.co.uk/site-5.htm, 2000-2006, printed Jul. 26, 2006.

Freepower ORC Electricity Company FP6 Product Description, "FP6," (1 page), available at http://www.freepower.co.uk/fp6.htm, 2000-2006, printed Jul. 26, 2006.

Freepower ORC Electricity Company FP120 Product Description, "FP120," (1 page), available at http://www.freepower.co.uk/fp120.htm, 2000-2006, printed Jul. 26, 2006.

Freepower ORC Electricity Company FP60 Product Description, "FP60 " (1 page), available at http://www.freepower.co.uk/fp60.htm, 2000-2006, printed Jul. 26, 2006.

Freepower ORC Electricity Company Products Technical Overview "A System Overview," (1 page), available at http://www.freepower.co.uk/tech-overview.htm, 2000-2006, printed Jul. 26, 2006.

Freepower ORC Electricity Company with Landfill Flarestacks, Flawstacks (Landfill & Petrochemical), (1 page) available at http://www.freepower.co.uk/site-2.htm, 2000-2006, printed Jul. 26, 2006.

Huynh, Co et al., "*Flywheel Energy Storage System for Naval Applications*," GT 2006-90270, Proceedings of GT 2006 ASME Turbo Expo 2006: Power for Land, Sea & Air, Barcelona, Spain, May 8-11, 2006, pp. 1-9.

Freepower ORC Electricity Company Home Page, "Welcome to Freepower," (1 page) available at http://www.freepower.co.uk/, Jul. 18, 2006.

PureCycle: Overview, "Super-efficient, reliable, clean energy-saving alternatives—the future is here," (1 page) available at http://www.utcpower.com/fs/com/bin/fs_com_Page/0,5433,03400,00.html, printed Jul. 26, 2006.

Ormat Web Site: "Recovered Energy Generation in the Cement Industry," (2 pages) available at http://www.ormat.com/technology_cement_2.htm, printed Jul. 26, 2006.

McMullen, Patrick et al., "*Flywheel Energy Storage System with AMB's and Hybrid Backup Bearings*," Tenth International Symposium on Magnetic Bearings, Martigny, Switzerland, Aug. 21-23, 2006, 6 pages.

International Search Report and Written Opinion of the International Searching Authority issued in International Application No. PCT/US2009/031837 on Sep. 7, 2009; 11 pages.

International Preliminary Report on Patentability issued in International Application No. PCT/US2009/031837 on Jul. 27, 2010, 6 pages.

International Search Report and Written Opinion of the International Searching Authority issued in International Application No. PCT/US2009/058816, mailed Jun. 10, 2010, 10 pages.

International Preliminary Report on Patentability issued in International Application No. PCT/US2009/058816 on Apr. 12, 2011, 5 pages.

Meeks, Crawford, "*Development of a Compact, Lightweight Magnetic Bearing,*" 26th Annual AIAA/SAE/ASME/ASEE Joint Propulsion Conference, Jul. 16-18, 1990, 9 pages.

Ehmann et al., "*Comparison of Active Magnetic Bearings With and Without Permanent Magnet Bias,*" Ninth International Symposium on Magnetic Bearings, Lexington, Kentucky, Aug. 3-6, 2004, 6 pages.

Office Action issued in U.S. Appl. No. 12/569,559 on Apr. 25, 2011, 9 pages.

Notice of Allowance issued in U.S. Appl. No. 12/569,559 on Aug. 9, 2011, 9 pages.

\* cited by examiner

MEASURING LINEAR VELOCITY

BACKGROUND

This disclosure relates to measuring linear velocity.

In many cases, a need arises to measure the linear velocity of an object. It is also often desired to carry out such a measurement without mechanical contact and over a wide range of linear movement. Furthermore, the construction of the moving object of which velocity is to be measured often needs to be very robust. This imposes strict design limitations on the part of a velocity measuring device that will be mounted on the moving object. A particularly difficult case occurs when the moving object, in addition to its linear motion, also spins at a high rotational speed causing large centrifugal stresses within the object. An example application of a linear velocity sensor is in a damper, a device that exerts a damping force on a moving object proportional to a measured linear velocity of this object with an inverse sign.

SUMMARY

An apparatus for measuring linear velocity of a movable element relative to a stationary element includes a magnetic element fixed in relation to the stationary element. The magnetic element has a permanent magnet. A soft-magnetic yoke is fixed in relation to the movable element to move with the movable element relative to the stationary element. The soft-magnetic yoke is in non-contact relation with the magnetic element and has a pole positioned proximate to the magnetic element and spaced from the magnetic element by an air gap. The pole is magnetically coupled to the magnetic element so that a magnetic flux is generated in the air gap substantially orthogonal to the axis along which the movable element moves. A conductive coil is coiled around a coil axis. The conductive coil is fixed in relation to the stationary element with the coil axis substantially parallel to the axis of movement. The conductive coil is in non-contact relation with the soft-magnetic yoke and resides between the magnetic element and the pole of the soft-magnetic yoke in the magnetic flux.

A method includes communicating magnetic flux between a magnet fixed in relation to a stationary element and a soft-magnetic structure fixed in relation to a movable element. The method further includes generating a voltage proportional to a linear velocity of the movable element in relation to the stationary element on a conductive coil fixed in relation to the magnet and residing between the magnet and the structure.

An electric machine system includes a first assembly that moves in relation to a second assembly along an axis of movement. A magnet is fixed in relation to the second assembly. A coil is wound around an axis. The coil is fixed in relation to the second assembly with the axis substantially parallel to the axis of movement. A soft-magnetic structure is fixed in relation to the first assembly to move with the first assembly in relation to the second assembly. The magnet and the soft-magnetic structure cooperate to define a magnetic circuit conducting magnetic flux from the magnet through the coil substantially perpendicular to the coil axis and into the soft-magnetic structure. An electronics module is in electrical communication with the electrical coil and is fixed in relation to the second assembly.

The aspects above can include one or more or none of the following features. The magnetic element can include a first soft-magnetic pole element and a second soft-magnetic pole element. The permanent magnet has a pole axis extending through its north and south poles, and the pole axis can be oriented substantially parallel to axis of movement. The first soft-magnetic pole element can be magnetically coupled with the north pole of the permanent magnet, and the second soft-magnetic pole element magnetically coupled with the south pole of the magnet. The conductive coil can include a plurality of turns. The soft-magnetic yoke can include a second pole positioned proximate to the magnetic element and spaced from the magnetic element by an air gap. The second pole can be magnetically coupled to the magnetic element so that a magnetic flux is generated in the air gap substantially orthogonal to the axis of movement. A second conductive coil can be provided and coiled around the coil axis. The second conductive coil can be fixed in relation to the stationary element and in non-contact relation with the soft-magnetic yoke. The second conductive coil resides between the magnetic element and the second pole of the soft-magnetic yoke in the magnetic flux. The first conductive coil can be coupled to the second coil in series so that a voltage induced in the first and second conductive coils by movement of the yoke is additive. The first soft-magnetic pole element and the second soft-magnetic pole element can be cylindrical and substantially concentrically received within a cylindrical opening defined by the poles of the soft-magnetic yoke. Alternatively, the soft-magnetic yoke can be a solid cylinder received within the first and second soft-magnetic pole elements. The movable member can rotate about the axis of movement and the soft-magnetic yoke can be fixed in relation to the movable element to move with the movable element along the axis of movement and rotate with the movable element about the axis of movement. An electronics module can be provided that is electrically coupled to the conductive coil, and the conductive coil can be fixed in relation to the electronics module. The magnet can be fixed in relation to the electronics module.

The details of one or more embodiments are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

Figure 1A:
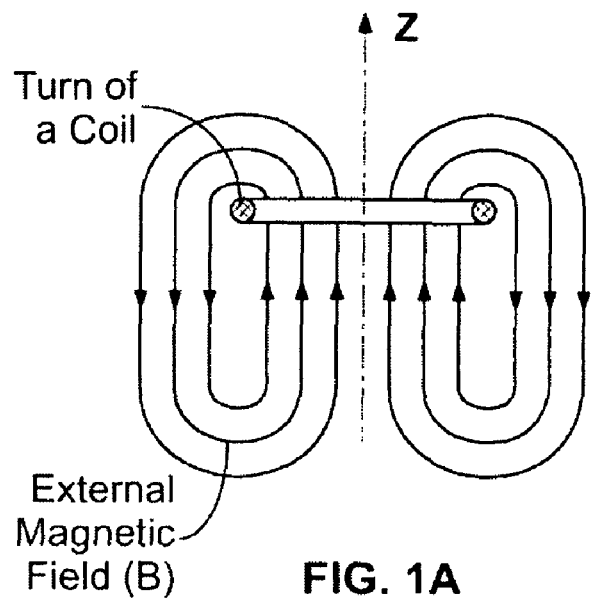
FIGS. 1A-D are schematics depicting relative movement between a single turn of a coil and an external magnetic field.

FIG. 1A shows a single open turn of an electrical coil exposed to an external magnetic field B. By definition, the external magnetic flux $\Phi_1$ linked to this turn is equal to the integral of the magnetic flux density over the cross-sectional area of the turn:

$$\Phi_1 = \int_{A_1} B\,dA. \tag{1}$$

Figure 1B:
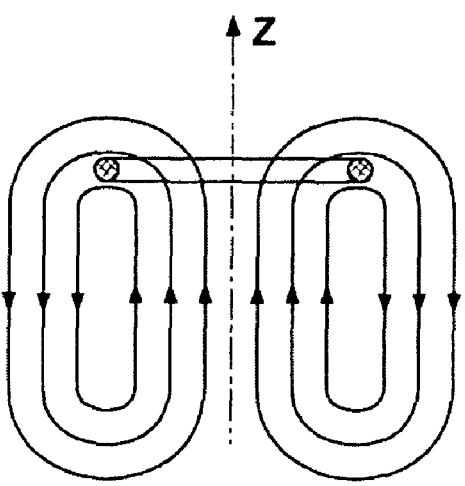
Figure 1C:
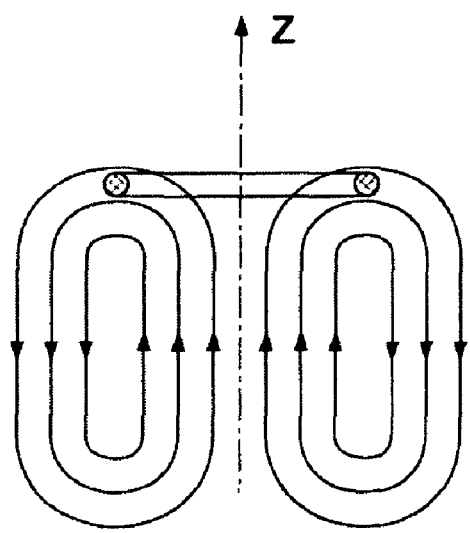
Figure 1D:
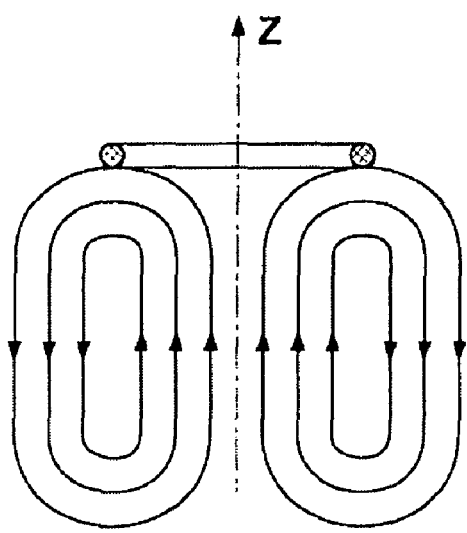

Assuming that the number of the flux lines crossing the area encompassed by the turn shown in FIG. 1 represents the magnetic flux through that area, as the turn gradually translates along the z axis with respect to the magnetic field, the flux through the turn changes from six lines in FIG. 1A, to four lines in FIG. 1B, to two lines in FIG. 1C, and finally to no lines in FIG. 1D.

If the field geometry is such that the number of flux lines through the turn is a linear function of the turn position z with respect to the field, then the flux $\Phi_1$ linked to the turn can be represented as a linear function of the turn position z:

$$\Phi_1 = Kz. \tag{2}$$

If the turn moves in the z direction with some velocity $v=\dot{z}$, then the flux linked to the turn will change in time and the rate of this change will be proportional to v. According to Faraday's law, the changing flux will induce a voltage on the turn terminals, also proportional to v:

$$U=-\dot{\Phi}_1=-K\dot{z}=-Kv. \tag{3}$$

Another approach to derive equation (3) is based on Lorenz's equation describing relativistic transformation between the electric and magnetic fields. According to Lorentz's law, a charge q moving with a velocity v in a magnetic field B experiences a force:

$$\vec{F}_q = q(\vec{v}\times\vec{B}). \tag{4}$$

Another way of arriving at Equation (4) is by analyzing forces acting on the charge q in the coordinate system linked to this charge. In this coordinate system, the charge is stationary and the force $F_q$ is produced by an electric field:

$$\vec{E} = \vec{v}\times\vec{B} \tag{5}$$

so that $$\vec{F}_q = q\vec{E}. \tag{6}$$

The equation (5) establishes a relativistic relationship between electric and magnetic components of an electromagnetic field observed in two coordinate systems moving with respect to each other with a relative velocity v.

If an open conductive wire of an arbitrary shape moves in a magnetic field B, integrating (5) over the entire length L of the wire gives a voltage induced between the wire ends:

$$U = \int_L (\vec{v}\times\vec{B})\cdot d\vec{l}. \tag{7}$$

If the velocity is known to be always directed in a particular direction (z axis in FIG. 1), then, (7) can be rewritten as $$U = \left(\int_L (\vec{e}_z\times\vec{B})\cdot d\vec{l}\right)v, \tag{8}$$

where $\vec{e}_z$ is a unity vector directed along the z axis. By comparing (3) and (8), one can see that $$K = \int_L (\vec{e}_z\times\vec{B})\cdot d\vec{l}. \tag{9}$$

Using a plurality of turns, rather than a single turn, to measure velocity increases the gain K, and if the distribution of the field B along the z axis is not uniform, improves the linearity of the system because the gain K will not be dependent on the z position of the turn with respect to the field.

FIG. 2 shows a similar system using a coil comprising a plurality of turns. The integral (9) in this case has to be evaluated over the entire length of the wire in the coil, or over the length of the wire where B is not zero.

For example, a cylindrical coil shown in FIG. 2 is exposed to a magnetic field, which is assumed to be axisymmetric but allowed to be non-uniform in the z direction. The length of the coil is larger than the field span in the z direction. Of interest is the radial component of this field $B_r$, because its axial component, if existed, could not contribute to the gain K since its cross product with $\vec{e}_z$ would be zero (see equation (9)). As for the tangential field component, its existence would contradict the requirement for the field to be axisymmetric. Note, however, that this approach can also be extended to non-axisymmetric systems.

Figure 2A:
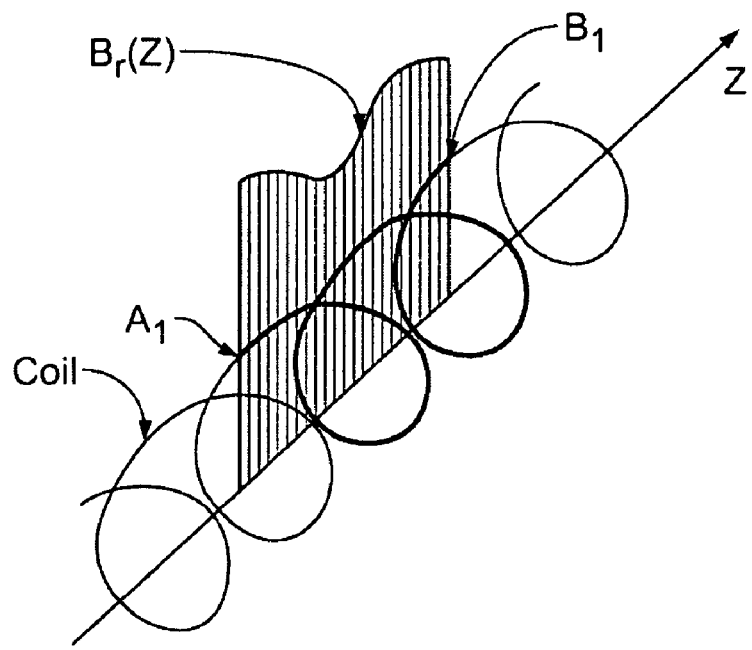
FIGS. 2A-B are schematics depicting relative movement between multiple turns of a coil and an external magnetic field.

FIG. 2A shows the original mutual orientation of the field and the coil when the coil section shown by a thicker line from the point $A_1$ to the point $B_1$ is exposed to the field. The axial profile of the field $B_r(z)$ is shown by the shaded area.

Figure 2B:
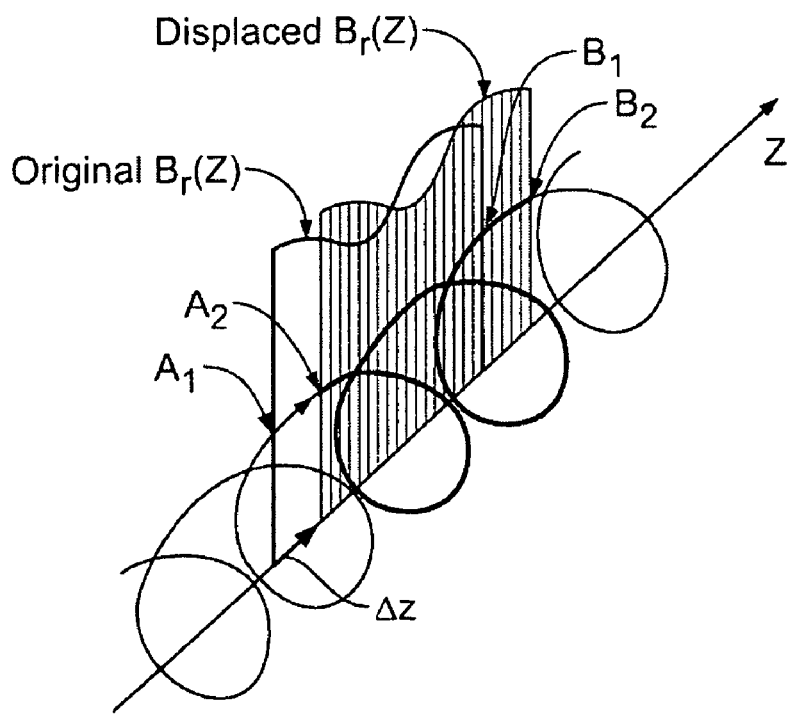

In FIG. 2B the field is displaced from the original position by some distance $\Delta z$. The field profile corresponding to the new displaced field position is shown by a shaded area, whereas its profile corresponding to the old position is outlined by a thicker line. Now, the section of the coil exposed to the field spans from the point $A_2$ to the point $B_2$. The sensor gain calculated using (9) will be the same for the FIG. 2A and FIG. 2B provided that the coil is wound uniformly in the z direction (with the same pitch). Indeed, the coil section $A_2$-$B_2$ is not any different from the section $A_1$-$B_1$, except that it is clocked slightly differently with respect to the field, but since the field is axisymmetric this clocking would not affect the integral (9).

Figure 3:
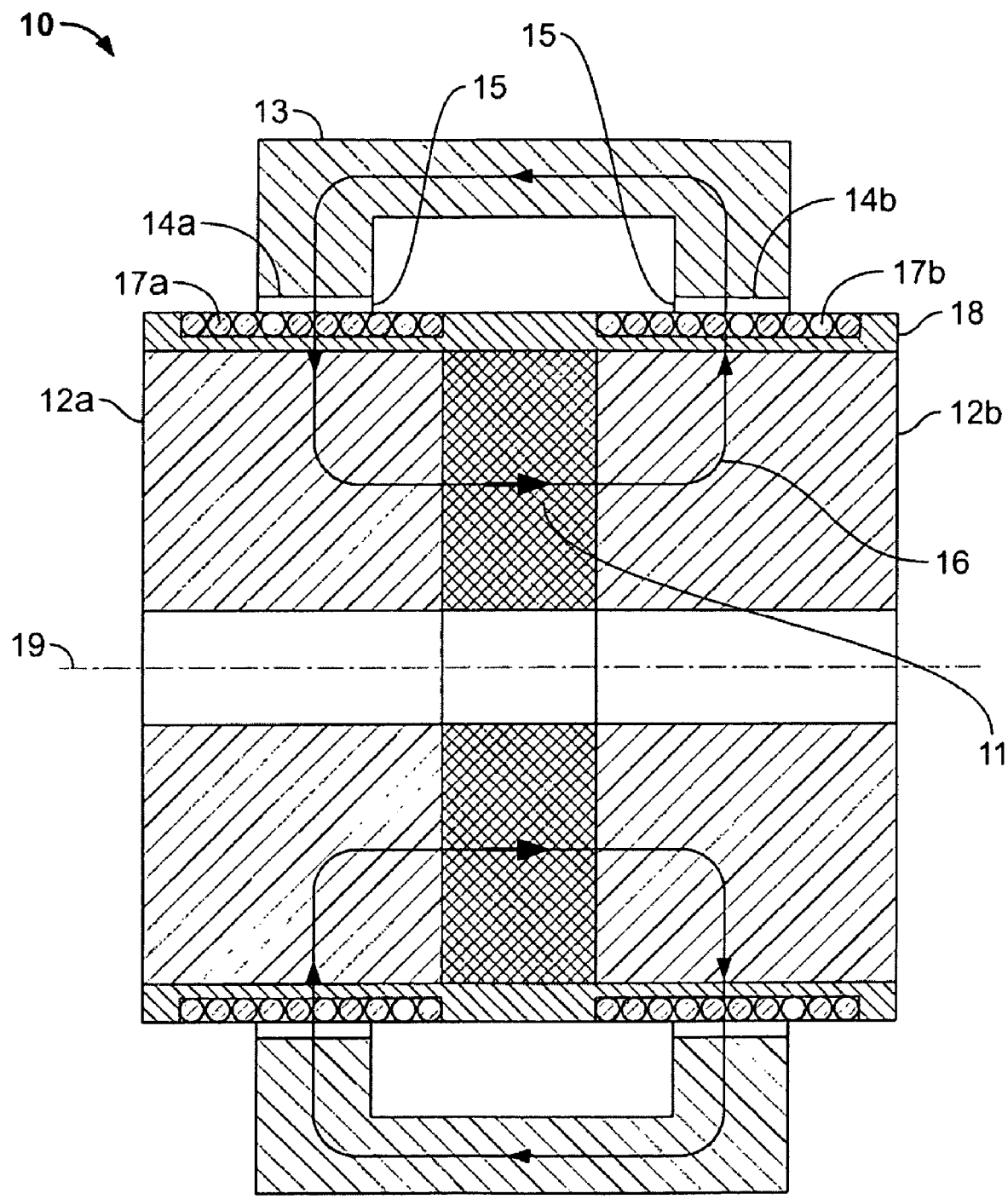
FIG. 3 is a cross-sectional view of an example sensor to measure axial velocities of rotors in rotating machines.
Figure 5:
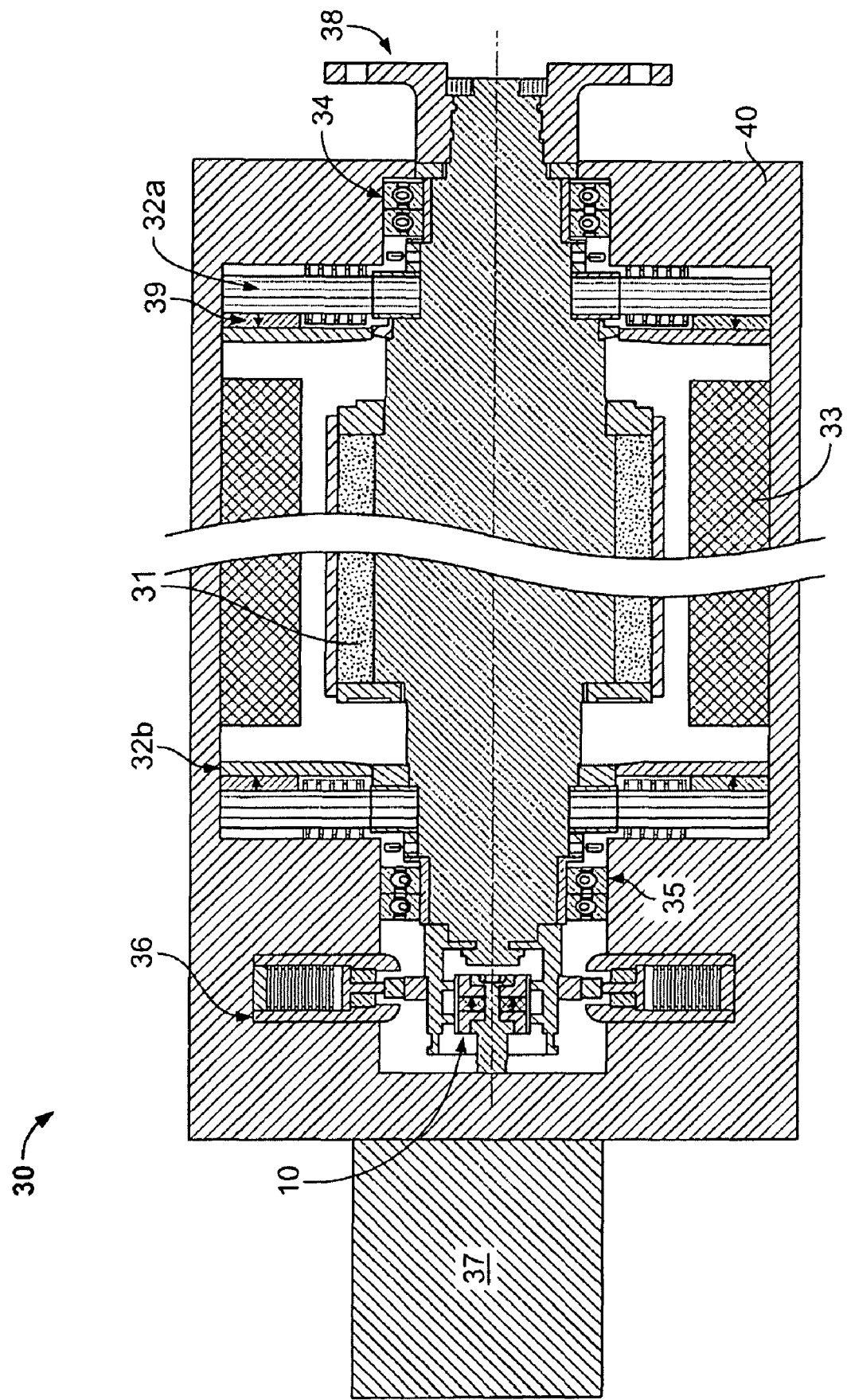
FIG. 5 is a cross-sectional view illustrating an example of a rotational electric machine configured with one embodiment of the velocity sensor.

FIG. 3 depicts an example of the linear velocity sensor 10 adapted for measuring the linear velocity along a rotational axis of a rotor in an electric machine 30, such as that shown in FIG. 5. The electric machine can be a motor, generator, and/or other type of electric machine. In other instances, these concepts and similar structures can be applied to measuring linear velocity of elements of other types of devices. For example, the linear velocity sensor 10 can be used to provide velocity feedback to improve the performance of active magnetic bearings, to measure velocities of sensitive elements in seismic or structural monitors, to improve the dynamic response of camera focusing or zooming mechanisms (e.g., such as that described U.S. Pat. No. 5,241,425), and/or in other applications.

The external magnetic field first introduced in FIGS. 1 and 2 is generated here by a cylindrical magnet 11 with two cylindrical soft-magnetic poles 12a and 12b attached to it. A soft-magnetic yoke 13 has two poles 14a and 14b adjacent to and separated by some air gaps 15 from the surfaces of the corresponding poles 12a and 12b. In certain instances, the soft-magnetic yoke 13 is mounted to or otherwise fixed in relation to the rotor (i.e., the movable element of the electric machine whose linear velocity is being measured), so that the soft-magnetic yoke 13 moves with the rotor. The magnet 11 and soft-magnetic poles 12a and 12b are mounted to or otherwise fixed in relation to a stationary element of the electric machine (e.g., the housing or other stationary element of the electric machine). The longitudinal axis 19 of the cylindrical magnet 11 and soft-magnetic poles 12a and 12b extends through the north and south poles of the magnet 11 and is substantially parallel to the rotational axis of the rotor. The magnet 11 and soft magnetic poles 12a and 12b are concentrically received within the soft-magnetic yoke 13. The magnet 11, poles 12a and 12b, and the soft-magnetic yoke 13 form a closed magnetic circuit with some magnetic flux 16 flowing in it. This flux is directed radially (i.e., perpendicular to the longitudinal axis 19) in the air gaps 15 between the stationary poles 12a and 12b and the yoke poles 14a and 14b. Between each stationary pole 12a and 12b and the soft-magnetic yoke poles 14a and 14b are sensing coils 17a and 17b wound around a non-conductive, generally cylindrical bobbin 18. The longitudinal axis of the bobbin 18 coincides with the axis 19, and the bobbin 18 is positioned proximate to the corresponding stationary poles 12a and 12b.

Using a permanent magnet to generate the magnetic field negates the need for additional power supplies, wiring, or other electronics. Other magnets, however, may additionally or alternatively be used.

Two coils 17a and 17b are wound and interconnected so that the voltages induced in these coils when the rotor moves axially with velocity v would be added rather than subtracted, resulting in high output gain (i.e., higher than the single turn example described above). For example, if both coil 17a and coil 17b are wound clockwise start-to-finish as viewed from the +z direction, then the coils are connected in series with the finish of coil 17a connected to the finish of coil 17b. The two starts of the coils would be the output terminals of the sensor. In other configurations, the coils may be wound and/or connected differently.

Alternatively, both coils 17a and 17b can be wound with a continuous wire. After the first coil is wound, the wire continues to the second coil segment and the winding continues with the winding direction being reversed. There are other methods of manufacturing the combined coil 17a and 17b without departing from the scope of the concepts herein. In certain instances, only one coil 17a or 17b could be used; however the sensor gain would be reduced by half.

By allowing the yoke 13 to translate and keeping the permanent magnet stationary (relative to the electric machine), the apparatus can withstand the high forces associated with, for example, high-speed rotating machinery. This is because the movable portion of the sensor (i.e., the yoke 13) is simple and robust. Both the magnet 11 and the coils 17, which are mechanically the weaker parts of the device, are kept stationary.

Using a sensing coil configuration where the sensing coils 17 span an axial distance equal to or in excess of the linear distance traveled by the yoke 13 ensures that the sensor output is linear over a wide displacement range.

Figure 4:
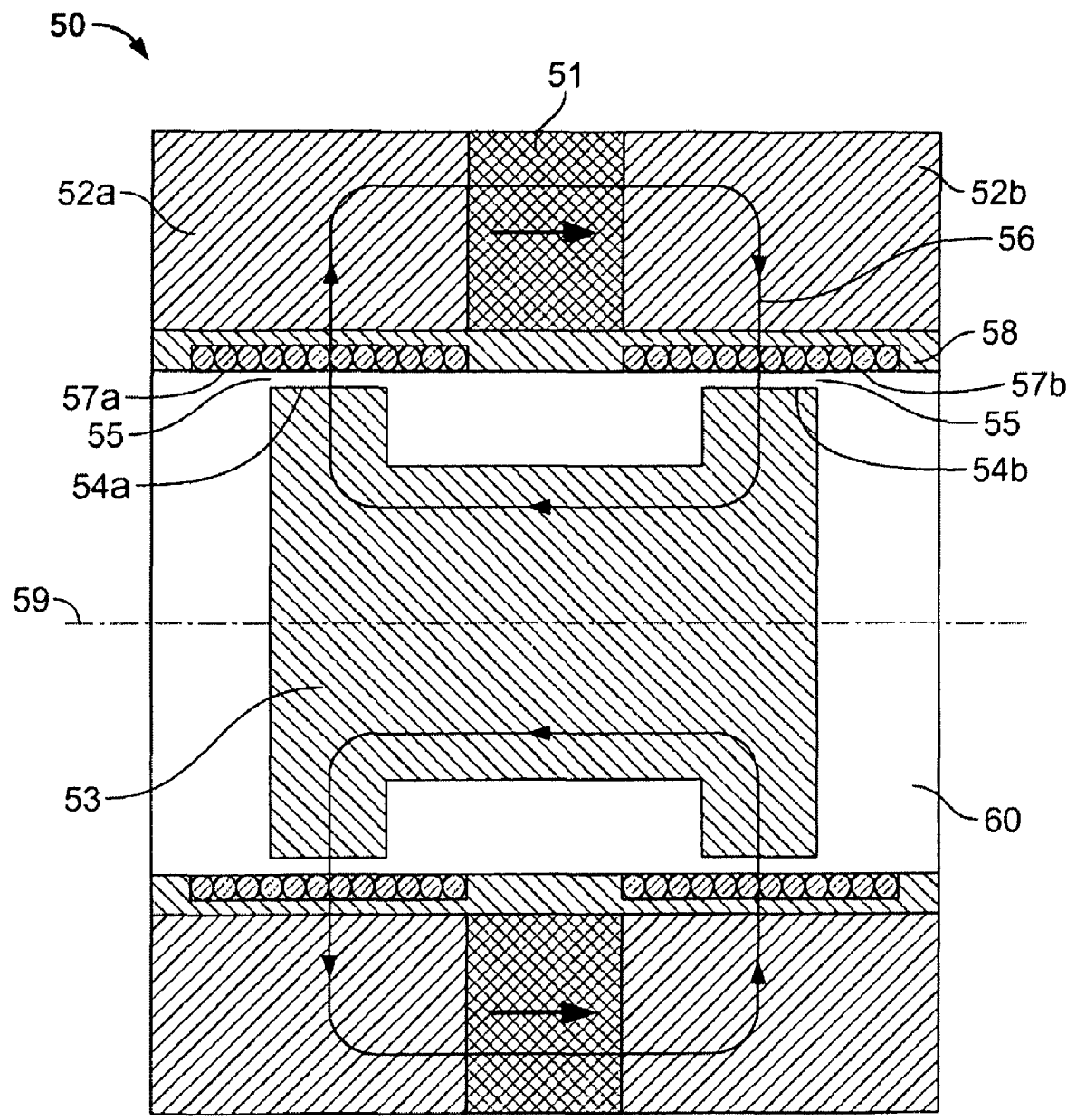
FIG. 4 is a cross-sectional view of an alternative embodiment of the sensor to measure axial velocities of rotors in rotating machines.

FIG. 4 illustrates linear velocity sensor 50 showing the yoke 53 residing within the magnet 51 and soft-magnetic poles 52a and 52b. In the embodiment shown in FIG. 4 the yoke 53 is configured as a solid cylinder of soft-magnetic material that moves inside a bore 60 of the magnet 51 and poles 52a and 52b. The soft-magnetic yoke 53 has two poles 54a and 54b adjacent to and separated by some air gaps 55 from the surfaces of the corresponding poles 52a and 52b. The longitudinal axis 59 of the cylindrical magnet 51 and soft-magnetic poles 52a and 52b extends through the north and south poles of the magnet 51 and is substantially parallel to the rotational axis of the rotor. The soft-magnetic yoke 53 is concentrically received within the magnet 51 and soft magnetic poles 52a and 52b. The magnet 51, poles 52a and 52b, and the soft-magnetic yoke 53 form a closed magnetic circuit with some magnetic flux 56 flowing in it. This flux is directed radially (i.e., perpendicular to the longitudinal axis 59) in the air gaps 55 between the stationary poles 52a and 52b and the yoke poles 54a and 54b. Coils 57a and 57b could be inserted in the bore, interconnected in series so that changes of the fluxes linked to the coils 57a and 57b caused by the yoke 53 movements add together for high gain output. A bobbin 58 could also be inserted within the annulus 60, providing an additional layer of insulation between the coils 57a and 57b and the stationary soft-magnetic poles 52a and 52b. Between each stationary pole 52a and 52b and the soft-magnetic yoke poles 54a and 54b are sensing coils 57a and 57b wound within a non-conductive, generally cylindrical bobbin 58. The longitudinal axis of the bobbin 58 coincides with the axis 59, and the bobbin 58 is positioned proximate to the corresponding stationary poles 52a and 52b.

Furthermore, cylindrical shapes of the components specified in FIGS. 3-4 are tailored to a rotational system and could be replaced with other shapes, depending on the configuration of the system.

FIG. 5 shows an example of using the velocity sensor 10 in combination with an axial electromagnetic actuator 36 and electronics 37 to damp axial oscillations of the rotor 31 in an electric rotational machine 30.

The electric machine 30 shown in FIG. 5 has a rotor 31 and a stator 33. The rotor 31 of the electric machine 30 is supported radially without mechanical contact by means of front and rear radial Active Magnetic Bearings (AMBs) 32a and 32b. The front AMB 32a also provides some passive axial rotor alignment using the interaction between parts of a magnetic circuit mounted on the rotating and stationary parts of the AMB 32a, which is energized with a permanent magnet 39 within the stator of AMB 32a. This alignment is typically needed for testing and commissioning prior to installation. When installed, the rotor 31 of the electric machine 30 will be coupled through a coupling 38 mounted on the right end of the rotor 31 to a shaft of another piece of equipment (not shown) driven by (in the case of a motor) or driving (in the case of a generator) the electric machine 30. In this case, the coupling 38 (and the equipment coupled to the rotor 31 by the coupling) will dictate the axial position of the rotor 31. The axial displacements of the rotor 31 in FIG. 5 can be fairly large; however, they still have some limits beyond which the machine 30 (specifically AMBs 32a, b) would not operate properly. Considering these limits, non-magnetic thrust and radial backup bearings 34 are installed on the front end of the machine 30 to prevent the rotor 31 from moving beyond tolerable limits of the axial displacements. The thrust and radial backup bearings 34 also function to support the rotor 31 radially along with a rear non-magnetic radial backup bearing 35 when AMBs 32a, b are inactive.

Eliminating mechanical contact by using magnetic bearings allows the machine 30 to operate at very high rotational speeds without wear, tear, and overheating. The problem is, however, that the rotor 31 floating in space without friction is very responsive to even small axial vibrations of the equipment it is coupled to. Using an AMB to control axial movement of the rotor, however, significantly increases the cost and complexity of the machine 30, as well as imposes much stricter requirements on the axial alignment between the rotors 31 of the electric machine 30 and the driven equipment.

Thus, as described herein, employing the axial velocity sensor 10 with the axial actuator 36 provides an economical and relatively simple way of measuring and damping even small axial vibrations of the equipment.

To suppress possible axial vibrations of the electric machine rotor 31, the axial damper actuator 36 and velocity sensor 10 are installed on the free (i.e., not coupled) rear end of the rotor in FIG. 5. A current amplifier is also provided housed within electronics module 37, which is fixed in relation to the stationary components of the electric machine 30 (e.g., the stator 33 and housing 40 of the electric machine). Whenever there is an axial velocity of the rotor v, the axial velocity sensor 10 generates a voltage U=–Kv proportional to this velocity with the inverse sign according to Equation 3. This voltage is then input into the current amplifier, which generates a current I in the control winding of the axial damper actuator proportional to U. The latter, in its turns, exerts an axial force $F_d$ on the rotor of the electric machine proportional to I, and, consequently, proportional to –v with some proportionality coefficient C (damping coefficient):

$$F_d = -Cv.$$

$F_d$ substantially damps axial movement of the rotor 31.

Figure 6:
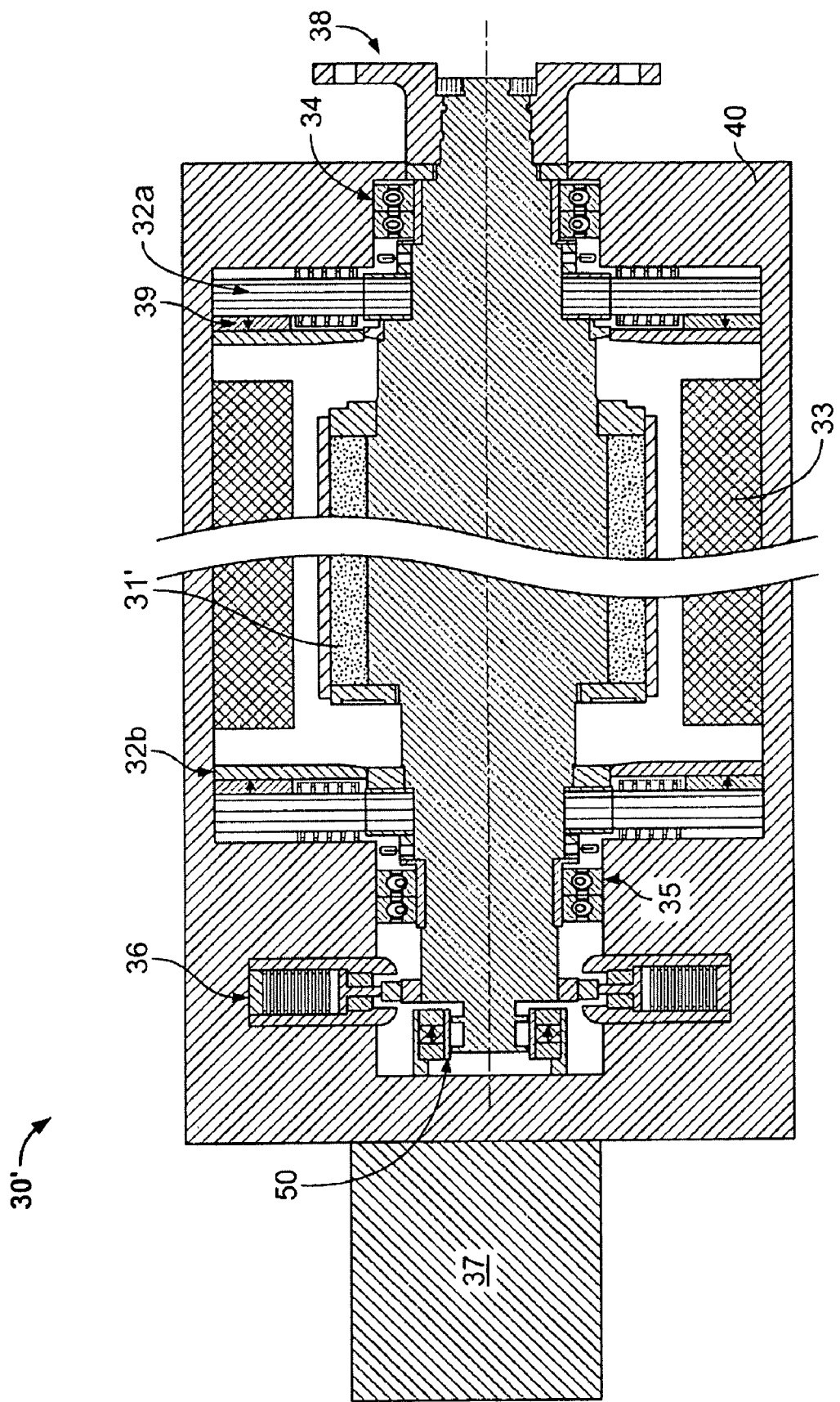
FIG. 6 is a cross-sectional view illustrating another example of a rotational electric machine configured with an alternative embodiment of the velocity sensor.

FIG. 6 shows an example of using the alternative embodiment of the velocity sensor 50 in combination with an axial electromagnetic actuator 36 and electronics 37 to damp axial oscillations of a rotor 31' in an electric rotational machine 30'.

Figure 7:
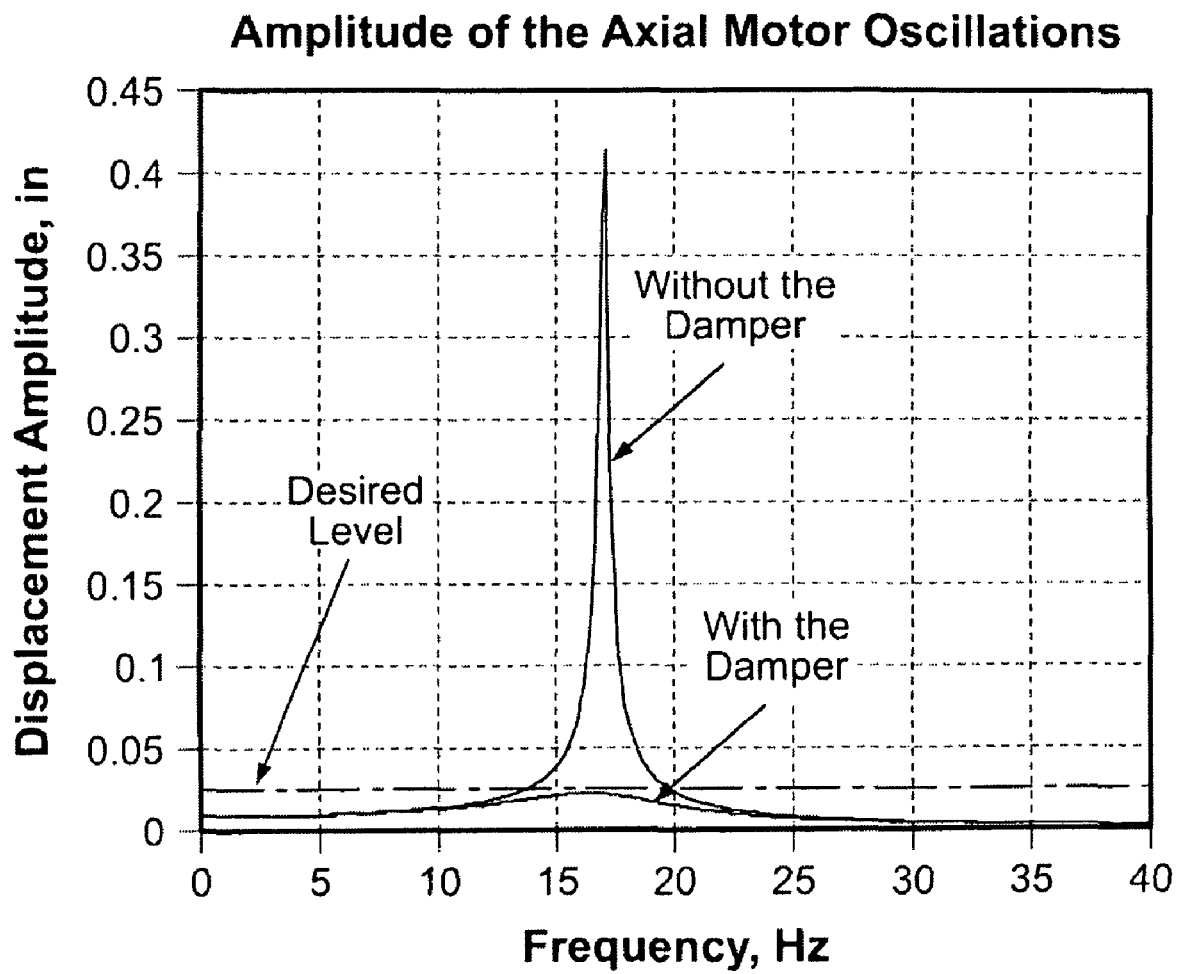
FIG. 7 is a graph showing amplitudes of the axial oscillations of the electric machine rotor resulting from the axial oscillations of a coupled rotor with a 0.01 inch amplitude.

FIG. 7 shows amplitudes of the axial oscillations of the rotor 31 resulting from the axial oscillations of a coupled rotor of a driving/driven equipment with a 0.01 inch amplitude with and without the axial electromagnetic damping.

A number of embodiments have been described. Nevertheless, it will be understood that various modifications may be made without departing from the concepts described herein. Accordingly, other embodiments are within the scope of the following claims.

What is claimed is:

1. An apparatus for measuring linear velocity of a movable element relative to a stationary element along an axis of movement, the apparatus comprising:
    a magnetic element fixed in relation to the stationary element, the magnetic element having a permanent magnet;
    a soft-magnetic yoke fixed in relation to the movable element to move with the movable element relative to the stationary element, the soft-magnetic yoke being in non-contact relation with the magnetic element and having a pole positioned proximate to the magnetic element and spaced from the magnetic element by an air gap, the pole magnetically coupled to the magnetic element so that a magnetic flux is generated in the air gap substantially orthogonal to the axis of movement; and
    a conductive coil coiled around a coil axis, the conductive coil fixed in relation to the stationary element with the coil axis substantially parallel to the axis of movement, in non-contact relation with the soft-magnetic yoke and residing between the magnetic element and the pole of the soft-magnetic yoke in the magnetic flux.

2. The apparatus of claim 1, wherein:
    the magnetic element further comprises a first soft-magnetic pole element and a second soft-magnetic pole element; and
    the permanent magnet has a pole axis extending through its north and south poles and the pole axis is oriented substantially parallel to axis of movement, the first soft-magnetic pole element magnetically coupled with the north pole of the permanent magnet and the second soft-magnetic pole element magnetically coupled with the south pole of the magnet.

3. The apparatus of claim 2, wherein the first soft-magnetic pole element and the second soft-magnetic pole element are cylindrical and substantially concentrically received within a cylindrical opening defined by the poles of the soft-magnetic yoke.

4. The apparatus of claim 2, wherein the first soft-magnetic pole element and the second soft-magnetic pole element define cylindrical openings within which the soft-magnetic yoke is received.

5. The apparatus of claim 1, wherein the conductive coil comprises a plurality of turns.

6. The apparatus of claim 1, wherein:
    the conductive coil is a first conductive coil;
    the soft-magnetic yoke further comprises a second pole positioned proximate to the magnetic element and spaced from the magnetic element by an air gap, the second pole magnetically coupled to the magnetic element so that a magnetic flux is generated in the air gap substantially orthogonal to the axis of movement; and
    the apparatus further comprises a second conductive coil coiled around the coil axis, the second conductive coil fixed in relation to the stationary element being in non-contact relation with the soft-magnetic yoke and residing between the magnetic element and the second pole of the soft-magnetic yoke in the magnetic flux.

7. The apparatus of claim 6, wherein the first conductive coil is coupled to the second conductive coil in series so that a voltage induced in the first and second conductive coils by movement of the yoke is additive.

8. The apparatus of claim 1, wherein the movable element rotates about the axis of movement and the soft-magnetic yoke is fixed in relation to the movable element to move with the movable element along the axis of movement and rotate with the movable element about the axis of movement.

9. The apparatus of claim 1, further comprising an electronics module electrically coupled to the conductive coil, wherein the conductive coil is fixed in relation to the electronics module.

10. The apparatus of claim 9, wherein the magnet is fixed in relation to the electronics module.

11. A method of measuring linear velocity, the method comprising:
    communicating magnetic flux between a magnet fixed in relation to a stationary element and a soft-magnetic structure fixed in relation to a movable element;
    conducting the magnetic flux through a magnetic circuit, the magnetic circuit including the magnet, the soft-magnetic structure, and a conductive coil; and
    generating a linear velocity measurement as a voltage proportional to a linear velocity of the movable element in relation to the stationary element on the conductive coil, the conductive coil fixed in relation to the magnet and residing between the magnet and the soft-magnetic structure.

12. The method of claim 11, further comprising communicating the voltage in the conductive coil to a current amplifier and communicating current from the current amplifier to an actuator to generate a force on the movable element proportional to the velocity of the movable element.

13. The method of claim 11, wherein the movable element rotates about an axis of movement, and the soft-magnetic structure is fixed in relation to the movable element to move with the movable element along the axis of movement and rotate with the movable element about the axis of movement.

14. An electric machine system, the system comprising:
a first assembly that moves in relation to a second assembly along an axis of movement,
a magnet fixed in relation to the second assembly;
a coil wound around a coil axis, the coil fixed in relation to the second assembly with the axis substantially parallel to the axis of movement;
a soft-magnetic structure fixed in relation to the first assembly to move with the first assembly in relation to the second assembly;
the magnet and the soft-magnetic structure cooperating to define a magnetic circuit conducting magnetic flux from the magnet through the coil substantially perpendicular to the coil axis and into the soft-magnetic structure; and
an electronics module in electrical communication with the coil and fixed in relation to the second assembly.

15. The system of claim 14, wherein the magnet has a pole axis extending through its north and south poles and the pole axis is oriented substantially parallel to axis of movement, and wherein the system further comprises a first soft-magnetic pole element in magnetic communication with the north pole of the magnet and a second soft-magnetic pole element in magnetic communication with the south pole of the magnet.

16. The system of claim 14, wherein the first assembly is a rotor that rotates about the axis of movement and the second assembly is a stator.

17. The system of claim 14, further comprising a damper actuator in communication with the electronics module, the damper actuator being fixed in relation to the second assembly; and
wherein the electronics module is adapted to power the damper actuator to apply a force on the first assembly along the axis of movement, the force being determined as a function of a linear velocity of the first assembly.

18. The system of claim 17, wherein the electronics module comprises a current amplifier adapted to output a current that is proportional to a voltage on the coil, and the force is proportional to the linear velocity of the first assembly.

19. A method comprising:
communicating magnetic flux between a magnet fixed in relation to a stationary element and a soft-magnetic structure fixed in relation to a movable element;
conducting the magnetic flux through a magnetic circuit, the magnetic circuit including the magnet, the soft-magnetic structure, and a conductive coil;
generating a voltage proportional to a linear velocity of the movable element in relation to the stationary element on the conductive coil, the conductive coil fixed in relation to the magnet and residing between the magnet and the soft-magnetic structure;
communicating the voltage in the conductive coil to a current amplifier; and
communicating current from the current amplifier to an actuator to generate a force on the movable element proportional to the velocity of the movable element.

20. A method comprising:
communicating magnetic flux between a magnet fixed in relation to a stationary element and a soft-magnetic structure fixed in relation to a movable element, the movable element configured to rotate about an axis of movement, the soft-magnetic structure fixed in relation to the movable element to move with the movable element along the axis of movement and to rotate with the movable element about the axis of movement;
conducting the magnetic flux through a magnetic circuit, the magnetic circuit including the magnet, the soft-magnetic structure, and a conductive coil; and
generating a voltage proportional to a linear velocity of the movable element in relation to the stationary element on the conductive coil, the conductive coil fixed in relation to the magnet and residing between the magnet and the soft-magnetic structure.

* * * * *